US011318884B2

(12) United States Patent
Smits

(10) Patent No.: US 11,318,884 B2
(45) Date of Patent: May 3, 2022

(54) VIDEO MONITORING SYSTEM FOR A MOTOR VEHICLE

(71) Applicant: Continental Automotive GmbH, Hannover (DE)

(72) Inventor: Thomas Smits, Munich (DE)

(73) Assignee: CONTINENTAL AUTOMOTIVE GMBH, Hanover (DE)

(*) Notice: Subject to any disclaimer, the term of this patent is extended or adjusted under 35 U.S.C. 154(b) by 0 days.

(21) Appl. No.: 16/963,588

(22) PCT Filed: Jan. 10, 2019

(86) PCT No.: PCT/EP2019/050574
§ 371 (c)(1),
(2) Date: Jul. 21, 2020

(87) PCT Pub. No.: WO2019/145161
PCT Pub. Date: Aug. 1, 2019

(65) Prior Publication Data
US 2021/0053490 A1 Feb. 25, 2021

(30) Foreign Application Priority Data

Jan. 23, 2018 (DE) ...................... 10 2018 201 027.7

(51) Int. Cl.
*B60R 1/00* (2022.01)
*B60R 11/04* (2006.01)
(Continued)

(52) U.S. Cl.
CPC ................ *B60R 1/00* (2013.01); *B60R 11/04* (2013.01); *G06V 20/56* (2022.01); *H04N 5/247* (2013.01);
(Continued)

(58) Field of Classification Search
CPC ...... B60R 1/00; B60R 11/04; B60R 2300/105; B60R 2011/004; B60R 2300/8066;
(Continued)

(56) References Cited

U.S. PATENT DOCUMENTS 10,434,945 B2  10/2019  Loehr et al.
2008/0044061 A1  2/2008  Hongo .......................... 382/104
(Continued)

FOREIGN PATENT DOCUMENTS

DE  10 2013 222 268  4/2015  ............... G06T 7/20
DE  10 2014 218 995  3/2016  ............... B60R 1/00
(Continued)

OTHER PUBLICATIONS

Search Report for International Application No. PCT/EP2019/050574, 10 pages, dated Aug. 7, 2018.
(Continued)

*Primary Examiner* — Nasim N Nirjhar
(74) *Attorney, Agent, or Firm* — Slayden Grubert Beard PLLC

(57) ABSTRACT

Various embodiments include a method for providing an image using a camera monitor system for a motor vehicle with a trailer, wherein the camera monitor system has a rear camera assigned to a rear side of the trailer, a side camera assigned to a longitudinal side of the motor vehicle, and a monitor for presenting images of the cameras. The method may include: capturing a first image with the rear camera; capturing a second image with the side camera; constructing a composite image comprising the first image and the second image based at least in part on an ascertained trajectory of the motor vehicle; and displaying the composite image on the monitor.

8 Claims, 3 Drawing Sheets

(51) Int. Cl.
   *H04N 5/247* (2006.01)
   *H04N 5/265* (2006.01)
   *H04N 7/18* (2006.01)
   *G06V 20/56* (2022.01)
   *B60R 11/02* (2006.01)
   *B60R 11/00* (2006.01)

(52) U.S. Cl.
   CPC ............. *H04N 5/265* (2013.01); *H04N 7/181* (2013.01); *B60R 11/0229* (2013.01); *B60R 2011/004* (2013.01); *B60R 2011/0049* (2013.01); *B60R 2300/105* (2013.01); *B60R 2300/303* (2013.01); *B60R 2300/8066* (2013.01)

(58) Field of Classification Search
   CPC ......... B60R 11/0229; B60R 2011/0049; B60R 2300/303; H04N 5/247; H04N 7/181; H04N 5/265; G06K 9/00791
   See application file for complete search history.

(56) References Cited

U.S. PATENT DOCUMENTS

| | | | |
|---|---|---|---|
| 2010/0191421 A1* | 7/2010 | Nilsson | B62D 6/003 701/41 |
| 2014/0309888 A1* | 10/2014 | Smit | B62D 15/0275 701/41 |
| 2016/0059888 A1* | 3/2016 | Bradley | B60D 1/62 701/41 |
| 2016/0264046 A1* | 9/2016 | Bochenek | B60D 1/30 |
| 2016/0366336 A1 | 12/2016 | Kuehnle | 348/148 |
| 2016/0366366 A1 | 12/2016 | Chen et al. | 348/459 |
| 2017/0280091 A1 | 9/2017 | Greenwood | H04N 5/445 |
| 2017/0341583 A1* | 11/2017 | Zhang | B60R 1/00 |
| 2018/0126903 A1* | 5/2018 | Herrmann | H04N 5/23238 |
| 2018/0267558 A1* | 9/2018 | Tiwari | H04N 13/204 |

FOREIGN PATENT DOCUMENTS

| | | | |
|---|---|---|---|
| DE | 10 2017 111 530 | 11/2017 | ............... H04N 7/18 |
| JP | 2016119256 A | 6/2016 | ......... H01M 10/0566 |
| WO | 2016/026870 | 2/2016 | ............... H04N 7/18 |
| WO | 2017/020898 A1 | 2/2017 | ............... B60R 1/00 |

OTHER PUBLICATIONS

Office Action for DE Application No. 10 2018 201 027.7, 11 pages, dated Mar. 21, 2019.

Japanese Office Action, Application No. 2020540599, 5 pages, dated Aug. 16, 2021.

European Office Action, Application No. 19700666.1, 5 pages, dated Feb. 8, 2022.

* cited by examiner

VIDEO MONITORING SYSTEM FOR A MOTOR VEHICLE

CROSS-REFERENCE TO RELATED APPLICATIONS

This application is a U.S. National Stage Application of International Application No. PCT/EP2019/050574 filed Jan. 10, 2019, which designates the United States of America, and claims priority to DE Application No. 10 2018 201 027.7 filed Jan. 23, 2018, the contents of which are hereby incorporated by reference in their entirety.

TECHNICAL FIELD

The present disclosure relates to camera systems. Various embodiments include a camera monitor system for a motor vehicle, e.g., with a trailer.

BACKGROUND

Motor vehicles, for example trucks and passenger cars, conventionally have exterior mirrors. Mirror replacement systems in which the fields of view of the typical exterior mirrors are imaged by way of a camera and a monitor are also known. Such mirror replacement systems are also referred to as camera monitor systems.

SUMMARY

The teachings of the present disclosure include methods for operating a camera monitor system for a motor vehicle that enables reliable operation, in particular with a trailer of the motor vehicle, as well as apparatuses for operating a camera monitor system that enables reliable operation.

Various embodiments include a method for operating a camera monitor system (100) for a motor vehicle (101) with a trailer (202), in which the camera monitor system (100) has a camera (102), which is assigned to a rear side (106) of the trailer (202), and a further camera (103), which is assigned to a longitudinal side (106) of the motor vehicle (101), and a monitor (104) for presenting images of the cameras (102, 103), comprising: providing an image of the camera (102), providing a further image of the further camera (103), ascertaining an overall image comprising the image and the further image in dependence on an ascertained trajectory of the motor vehicle (101), and presenting the overall image on the monitor (104).

In some embodiments, ascertaining the trajectory comprises at least one of: ascertaining a speed of the motor vehicle (101), ascertaining a steering angle, ascertaining an articulation angle (107) between a towing vehicle (201) of the motor vehicle (101) and the trailer (202), and ascertaining a yaw rate of the trailer (202).

In some embodiments, ascertaining the overall image comprises combining the image and the further image by way of stitching.

In some embodiments, ascertaining the overall image comprises combining the image and the further image in such a way that a total field of view (S3) is presented in the overall image that is composed of a field of view (S2, S2') of the camera (102) and a field of view (S1, S2', S1") of the further camera (103).

In some embodiments, ascertaining the overall image comprises combining the image and the further image in such a way that a total field of view (S3) is presented in the overall image that is composed of a field of view (S2, S2') of the camera (102) and a partial region (S1') of the field of view (S1) of the further camera (103).

In some embodiments, the camera (102) is embodied as a removable camera, comprising: ascertaining a specified image content in the image and in the further image, ascertaining a position of the camera (102) relative to the further camera (103) in dependence on the ascertained image content.

In some embodiments, ascertaining the image content comprises at least one of: ascertaining side edges (108) of the trailer (202) in the image and the further image, and ascertaining side lamps (109) of the trailer (202) in the image and the further image.

In some embodiments, the camera monitor system (100) has at least two cameras (102) that are assigned to the rear side (106), comprising: ascertaining a specified image content in the respective image of the at least two cameras (102), and ascertaining a position of the at least two cameras (102) relative to one another and/or relative to the further camera (103) in dependence on the ascertained image content.

As another example, some embodiments include an apparatus for a motor vehicle (101) with a trailer (202), said apparatus being designed to carry out a method as described above.

As another example, some embodiments include a camera monitor system (100) for a motor vehicle (101) with a trailer (202), having: a camera (102), which is assigned to a rear side (106) of the trailer (202), a further camera (103), which is assigned to a longitudinal side (106) of the motor vehicle (101), a monitor (104) for presenting images of the cameras (102, 103), and an apparatus (110) as described above.

In some embodiments, the camera (102) is embodied as a removable camera.

BRIEF DESCRIPTION OF THE DRAWINGS

Advantages, features, and further developments can be gathered from the following examples which are explained in conjunction with the figures. Elements that are identical, of identical type and act identically may be provided with the same reference signs through the figures. In the drawings.

DETAILED DESCRIPTION

Figure 1:
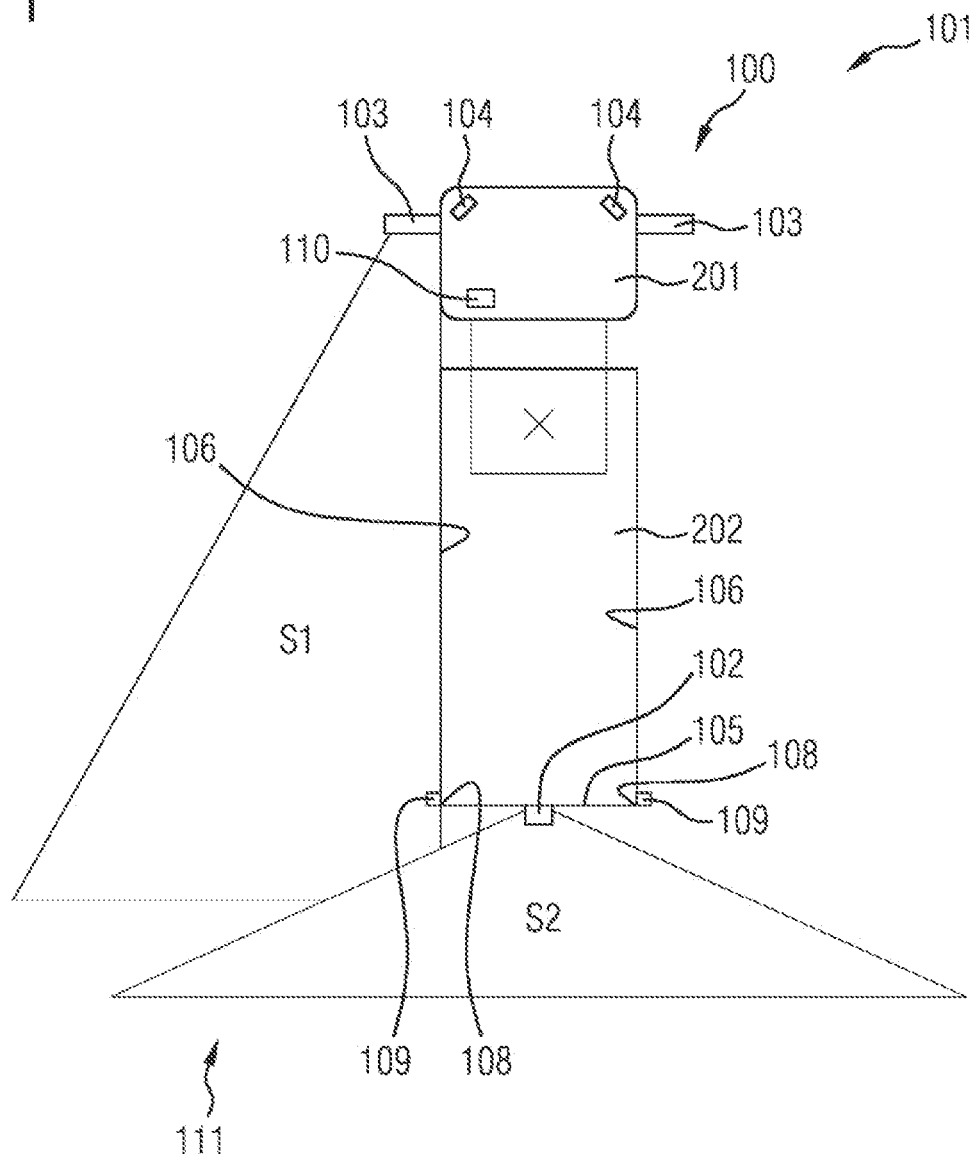
FIG. 1 shows a schematic illustration of a motor vehicle with a camera monitor system incorporating teachings of the present disclosure.

Various embodiments of the teachings herein include methods for operating a camera monitor system for a motor vehicle with a trailer and corresponding apparatuses designed to carry out the methods. In some embodiments, the camera monitor system has a camera that is assigned to a rear side of the trailer. For example, the camera is designed to be mounted on the rear side of the trailer to record an environment at the rear side of the trailer. The camera monitor system has a further camera, which is assigned to a side of the motor vehicle. The side is in particular a longitudinal side that extends in the normal direction of travel between the front windshield of the motor vehicle and a rear end of the trailer. The further camera is in particular designed to provide an image of the environment of the motor vehicle in the region of the side of the motor vehicle. The camera monitor system also has a monitor for presenting images of the cameras.

An image of the camera is captured. An image of the further camera is captured. An overall image comprising the image and the further image is ascertained in dependence on an ascertained trajectory of the motor vehicle. The overall image is presented on the monitor.

These methods thus enable a combination of the camera, which can also be referred to as a reversing camera, and the further camera, which is, for example, part of a mirror replacement system for replacing a conventional exterior mirror. No additional monitor is required to present the image of the camera in the vehicle. The image of the camera is presented together with the further image of the further camera on the monitor of the mirror replacement system. The monitor is arranged, for example, in a lateral region of the motor vehicle. Thus, the environment presented can be intuitively grasped by a user even if the motor vehicle has a trailer. In particular, regions that are not able to be imaged with a conventional mirror replacement system or conventional exterior mirrors are able to be imaged in the monitor.

The region behind the trailer becomes visible. Legal specifications for the position of the monitor as a replacement for a conventional exterior mirror are able to be met in this case.

The driver does not have to look at a further separate monitor, which is arranged in the middle of the vehicle, for example, in order to be able to see the rearward region behind the trailer. This makes the use more comfortable for the driver. When reversing, for example, the region inside the curve and the region outside the curve and also the rearward region can be seen on the two monitors replacing the left and right conventional exterior mirrors. The rearward region can therefore be grasped easily and intuitively. In particular, no separate monitor for presenting the rear region is necessary for this. A further monitor is optionally possible for example in the central region of the motor vehicle. The driver can thus comfortably view the rear region without having to look at a further monitor.

In some embodiments, the motor vehicle is, for example, a truck with a trailer, for example a tractor with a trailer. The motor vehicle can also be a truck with a drawbar trailer and/or a bus with a trailer. In some embodiments, the motor vehicle is alternatively or additionally a passenger car with a trailer.

The consideration of the trajectory of the motor vehicle enables the presentation of the image and of the further image to be appropriately adapted to the respective driving situation. For example, the overall image presented is adapted depending on the articulation angle between a towing vehicle of the motor vehicle and the trailer.

In some embodiments, ascertaining the trajectory comprises ascertaining a speed of the motor vehicle. In some embodiments, ascertaining the trajectory comprises ascertaining a steering angle. In some embodiments, ascertaining the trajectory comprises ascertaining a yaw rate of the towing vehicle. It is thus possible, depending on the driving state of the motor vehicle, to combine the image and the further image to form the overall image in such a way that a desired section from the environment is presented on the monitor.

In some embodiments, the image and the further image are combined by way of stitching. The image and/or the further image are thus distorted such that a contiguous overall image is presented on the monitor.

In some embodiments, the image and the further image are combined in such a way that a field of view, which is composed of a field of view of the camera and a field of view of the further camera, is presented in the overall image. In particular, the field of view of the further camera is supplemented by the field of view of the camera. The field of view of the further camera essentially corresponds, for example, to the field of view of the conventional exterior mirrors on one side. This field of view is supplemented by the field of view of the camera, which is assigned to the rear side of the trailer. This makes it possible, for example, to present the trailer in a partially transparent manner on the monitor in the overall image. In addition to presenting the environment laterally of the motor vehicle.

In some embodiments, the image and the further image are combined in such a way that a field of view is presented in the overall image that is composed of a field of view of the camera and a partial region of the field of view of the further camera. The field of view of the further camera is covered by the trailer itself, in particular when cornering. This part of the field of view is not presented in the overall image, for example. The partial region of the field of view of the further camera that continues to depict the environment next to the trailer is presented. This partial region is supplemented by the field of view of the camera, so that, overall, the conventional field of view of the further camera at an articulation angle of 0° is able to be simulated.

In some embodiments, the camera comprises a removable camera. The camera is attachable to and removable again from the trailer non-destructively. It is thus possible to also use the method and the camera monitor system in motor vehicles that are not originally equipped with a camera on the rear side of the trailer. For calibration, a specified image content is ascertained in each case in the image and in the further image. A position of the camera relative to the further camera is ascertained in dependence on the ascertained image content. This makes it possible to compensate for tolerances when mounting the removable camera.

In some embodiments, ascertaining the image content comprises ascertaining side edges of the trailer in the image and in the further image. In some embodiments, side lamps of the trailer are ascertained in each case in the image and the further image. In some embodiments, clearly recognizable, distinctive points of the environment are used, which are depicted in the image and the further image. It is also possible to calibrate the camera and the further camera using calibration points in a workshop environment.

In some embodiments, the camera monitor system comprises the camera, the further camera, the monitor, and the apparatus which is designed to carry out a method as described herein. Advantages, features, and further developments described for the methods also apply to the apparatuses and to the systems, and vice versa.

FIG. 1 shows a schematic illustration of a motor vehicle 101 incorporating teachings of the present disclosure. The motor vehicle 101 is, for example, a truck with a towing vehicle 201 and a trailer 202. In some embodiments, the motor vehicle 101 is a bus and/or a passenger car with a trailer 202. The motor vehicle 101 has a camera monitor system 100 as a mirror replacement system. The camera monitor system 100 has a camera 103 per longitudinal side 106 of the motor vehicle 101. The cameras 103 serve to record a respective lateral environment 111 of the respective assigned side 106.

The camera monitor system 100 has two monitors 104, which are assigned in each case to one of the sides 106. During operation, a section of the environment 111 is presented on the respective assigned monitor 104. In particular, a field of view S1 of the camera 103 is presented in its entirety or in part on the assigned monitor 104 in order to present the legally prescribed field of view classes, for example the field of view classes 2, 4, and 5. The image presented on the monitor 104 is in particular configured to present a mirror image of a conventional exterior mirror and, in particular, to present further sections of the environment 111 that cannot be depicted with conventional exterior mirrors.

In some embodiments, there is an apparatus 110 which is coupled to the cameras 103 and the monitors 104 for the transmission of signals. The apparatus 110 is configured to control the cameras 103 and also the monitors 104. For example, the apparatus 110 is a control device or part of a control device of the motor vehicle 101.

An additional camera 102 is arranged on a rear side 105 of the trailer 202. The rear side 105 of the trailer 202 faces away from the towing vehicle 201 during normal operation. The camera 102 is coupled to the apparatus 110 for the transmission of signals. The apparatus 110 is configured to control the camera 102. For example, the camera 102 is wirelessly connected to the apparatus 110 for the transmission of signals. A connection via cable is also possible.

In some embodiments, the apparatus 110 is a component separate from the cameras 102, 103 and the monitors 104. According to further exemplary embodiments, the apparatus 110 is a constituent part of at least one of the cameras 102, 103 and/or of at least one of the monitors 104.

The camera 102, which can also be referred to as a reversing camera, is a mobile camera, for example. The mobile camera 102 is mountable on the trailer 202 and is removable again therefrom in a non-destructive manner and mountable on another trailer 202, for example. In some embodiments, the camera 102 is fixedly mounted on the trailer 202.

The camera 102 is configured to capture a region of the environment 111 behind the trailer 202. A field of view S2 of the camera 102 captures the environment 111 behind the trailer 202. The field of view S2 is in particular a region facing away from the towing vehicle 101.

The camera image of the camera 102 is transmitted in a wired or wireless manner to the apparatus 110 in the towing vehicle 201. An image of the camera 102 is presented on the monitor 104 of the mirror replacement system. For example, the monitor 104 is an already existing monitor of a mirror replacement system.

The field of view S2 that is additional compared to the conventional mirror replacement system is adaptively combined with the field of view S1, for example by way of stitching. For this purpose, the apparatus 110 ascertains in particular the trajectory of the motor vehicle 101. The speed of the motor vehicle 101 is taken into account here, for example. For example, the speed is ascertained from CAN information (CAN: controller area network). In some embodiments, a steering angle of the motor vehicle 101 is taken into account. In some embodiments, an articulation angle 107 (FIG. 3) and/or a yaw rate is taken into account. The yaw rate is ascertained, for example, by means of a gyroscope sensor or another control device.

Figure 2:
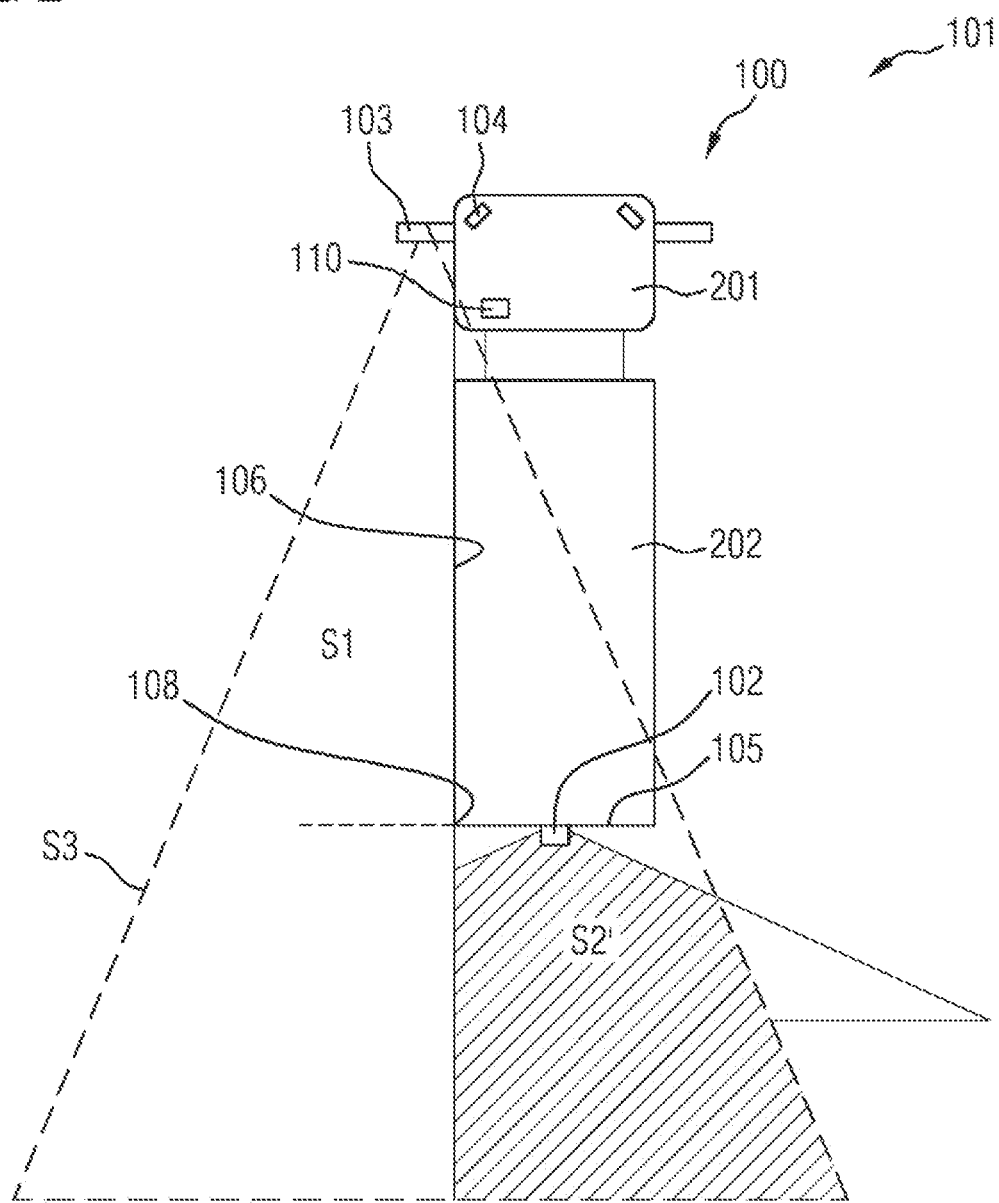
FIG. 2 shows a schematic illustration of a motor vehicle incorporating teachings of the present disclosure.

As can be seen from FIG. 2, the fields of view S1 and S2 of the cameras 102 and 103 are at least partially combined to form a total field of view S3 and presented on the associated monitor 104.

Depending on the vehicle trajectory, on known parameters of the motor vehicle 101, such as length, height and/or width, and also on the known fields of view S1 and S2 of the cameras 102 and 103, it is ascertained how the fields of view S1 and S2 are combined to form the total field of view S3 in order to also show the region on the rear side 105 for the driver on the monitor 104. The composition of the fields of view S1 and S2 is changed and adapted in particular in dependence on the ascertained trajectory, for example in dependence on the articulation angle between the towing vehicle 201 and the trailer 202.

The data link between the camera 102 and the apparatus 110 is, for example, realized in wired fashion using what is known as a BroadR Reach network or wirelessly via a wireless local network, for example in accordance with an IEEE802.11 standard. When using a wireless network, the antennas can be placed in the camera arm of the camera 103 of the mirror replacement system.

The images of the different cameras 102 and 103 are combined in particular in the apparatus 110 by way of stitching. Different views can be presented on the monitor 104 in this case. For example, the image of the reversing camera is shown in addition to the conventional presentations of the legally prescribed field of view classes. For example, the field of view class 4 is presented on the monitor 104 and additionally the image of the camera 102 next to the field of view class 2. For example, the image of the camera 102 is presented next to the field of view class 5 in addition to the field of view class 4. A partially transparent presentation of the trailer 202 is also possible, as shown for example in FIG. 2. Here, the field of view S1 of the camera 103 is supplemented with a partial region S2' of the field of view S2 of the camera 102 in such a way that a total field of view S3 that is expanded as compared to conventional mirror replacement systems is formed. This enables a presentation on the monitor 104 that simulates a view through the trailer 202.

Different combinations of the fields of view S1 and S2 to form the total region S3 are possible, in particular depending on a driving situation or the ascertained trajectory of the motor vehicle 101. Here, the field of view S1 of the camera 103 is designed, for example, such that it is aligned along the side 106 of the motor vehicle 101 and in particular of the trailer 202 or minimally covers or intersects it. The field of view S1 of the further camera 103 is composed, for example, of the fields of view for the statutory fields of view classes 2, 4 and 5. A plurality of cameras can also be used for this.

As shown in FIG. 2, a presentation of the conventional region S1 of the mirror replacement system is possible by expanding the field of view S1 by the partial region S2 and at the same time the region behind the trailer 202 is also representable by the combination with the partial region S2'. It would not be possible to depict said region without the camera 102. The two fields of view S1 and S2' are combined to form the total field of view S3 as if the total field of view S3 were a single field of view with a larger opening angle.

The images of the two cameras 102 and 103 are distorted in such a way that the best possible combining of the images is able to be realized. For this purpose, the position of the respective cameras 102 and 103 relative to one another and relative to the motor vehicle 101 is ascertained. During operation, for example when cornering, the respectively changed relative orientation of the cameras 102, 103 to one another is taken into account, for example, in accordance with the articulation angle 107, and the combining of the images of the cameras 102 and 103 is adapted accordingly.

The figures schematically illustrate the fields of view for the driver's side. Correspondingly, the method and the system are also able to be realized for the front passenger side.

Figure 3:
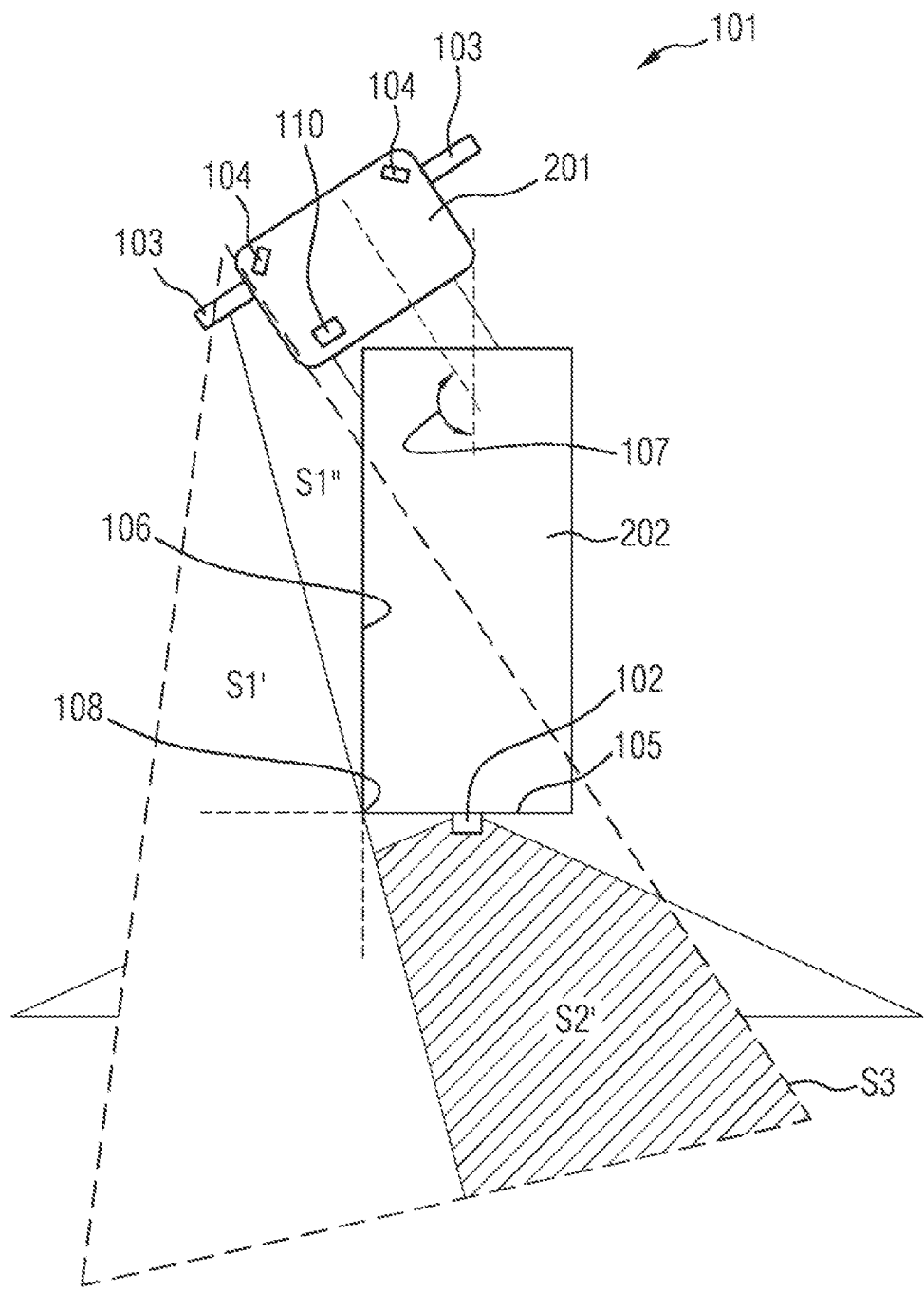
FIG. 3 shows a schematic illustration of a motor vehicle incorporating teachings of the present disclosure.

FIG. 3 shows an alternative composition of the fields of view S1 and S2 of the cameras 102 and 103 or of partial regions of the fields of view. For example, when the motor vehicle 101 is oriented in a straight line, that is to say an articulation angle 107 of 180°±5°, only the field of view S1 is shown on the monitor 104. The articulation angle 107 decreases during cornering. Depending on the articulation angle 107, only a partial region S1' of the field of view S1 is presented. The partial region S1' is the region of the field of view S1 that is directed outward from a side edge 108 of the trailer 202. The remaining partial region S1" of the field of view S1, which only depicts the side 106 of the trailer 202, is not used for presenting the total field of view S3 on the monitor 104. The region S1" is replaced by the partial region S2' of the camera 102 that depicts the environment 111 on the rear side 105. The total field of view S3 thus always remains the same size, independently of the articulation angle 107.

Rather than hiding the trailer 202 from the total field of view S3 by way of the partial field of view S2', it is also possible to present the trailer 202, but almost transparently, with the transparency being adjustable, for example. It is also possible to overlay the position of the trailer 202 in a color-transparent manner in the total field of view S3 presented. In some embodiments, the system presents the edges of the trailer 202 on the monitor 104 by way of lines, for example as a box. In some embodiments, there is a wireframe view. In some embodiments, there system may overlay an image filtered using conventional edge detection.

In some embodiments, the system may depict the partial region S1" on the monitor 104 in addition to the total field of view S3 without the partial region S2'. For example, the two regions S1' and S1", and S1' and S2' are presented side by side on the monitor 104. In this way, the driver can take both views into account.

In some embodiments, the system may present the field of view S2 or S2' on the monitor 104 in addition to the conventional presentation of the mirror replacement system in one of the two lower class 5 regions. In some embodiments, the image of the camera 102 is presented on a separate region of the monitor 104 or on an additional monitor. For example, the images of the cameras 103 of the mirror replacement system are used to this end as a supplement, and a combined view is presented, for example, on the monitor of a navigation system.

To ascertain the position of the camera 102 if the camera 102 is embodied as a removable camera, image contents of the cameras 102 and 103 are used, for example. If the camera lens of the camera 102 covers an angle greater than 180°, for example the two side edges 108 of the trailer 102 are detected in the image of the camera 102. The edges of one side of the sides 106 of the motor vehicle 101 are likewise detected for example in the image of the further camera 103. In some embodiments, for example side lamps 109 are recognized in the respective images of the cameras 102, 103. The side lamps 109 are also called rear position lamps. In some embodiments, the side lamps 109 are driven with a specified pattern during the ascertainment of the position of the cameras 102, 130 in order to be able to identify the side lamps 109 in the image and the further image well. For example, a specified blinking pattern is carried out.

Other image contents can also be used for the calibration, for example road markings and/or calibration points and/or distinctive image contents in the environment that are easy to recognize.

In some embodiments having fixedly installed reversing camera systems, two cameras 102 can be used, one on the right and one on the left on the rear side 104 of the trailer 202, for example to minimize parallax errors. In the case of a radio link, the two cameras 102 can establish a connection to one another and then one of the cameras 102 can assume the master role. A cable connection of the two cameras 102 is also possible, which means that only one wireless data connection to the apparatus 110 needs to be formed.

In some embodiments with removable cameras 102, the method described can also be used to ascertain a position of the two cameras 102 relative to one another, in particular by ascertaining an image content in the respective images of the cameras 102.

The camera monitor systems 100 described herein makes it possible, for the driver of the motor vehicle 101, to comfortably and intuitively present the region of the environment 111 behind the trailer 202 on the monitor 104, which region would not be conventionally visible without the camera 102.

What is claimed is:

1. A method for providing an image using a camera monitor system for a motor vehicle with a trailer, wherein the camera monitor system has a rear camera assigned to a rear side of the trailer, a side camera assigned to a longitudinal side of the motor vehicle, and a monitor for presenting images of the cameras, the method comprising:
   capturing a first image with the rear camera;
   capturing a second image with the side camera;
   constructing a composite image comprising the first image and the second image based at least in part on an ascertained trajectory of the motor vehicle; and
   displaying the composite image on the monitor;
   ascertaining a specified image content in the first image and in the second image, wherein the specified image content includes multiple side lamps of the trailer and the side lamps are driven in a specified blinking pattern to identify each respective side lamp; and
   ascertaining a position of the rear camera relative to the side camera based on the ascertained image content;
   wherein the monitor comprises a replacement for a left conventional exterior mirror, the monitor disposed in a cabin of the motor vehicle in front of and to the left of a driver seated in a driver's seat of the motor vehicle;
   wherein the side camera comprises a removable camera.

2. The method as claimed in claim 1, wherein ascertaining the overall image comprises combining the first image and the second image by stitching.

3. The method as claimed in claim 1, wherein ascertaining the overall image comprises combining the first image and the second image to provide a total field of view in the overall image composed of a first field of view of the first camera and a second field of view of the second camera.

4. The method as claimed in claim 1, wherein ascertaining the overall image comprises combining the first image and the second image to provide a total field of view composed of a first field of view of the first camera and a partial region of a second field of view of the second camera.

5. The method as claimed in claim 1, wherein ascertaining the image content further comprises ascertaining side edges of the trailer in the first image and the second image.

6. The method as claimed in claim 1, wherein the camera monitor system comprises two rear cameras assigned to the rear side of the vehicle;
   the method further comprising:
   ascertaining a specified image content in the respective image in each of the two rear cameras, and ascertaining a position of the two rear cameras relative to one another and/or relative to the second camera based on the ascertained image content.

7. A camera monitor system for a motor vehicle with a trailer, the camera monitor system comprising:
a rear camera assigned to a rear side of the trailer;
a side camera assigned to a longitudinal side of the motor vehicle;
a monitor for presenting images of the first camera and the second camera; and
a processor programmed to:
capture a first image with the rear camera;
capture a second image with the side camera;
ascertain a specified image content in the first image and in the second image, wherein the specified image content includes multiple side lamps of the trailer and the side lamps are driven in a specified blinking pattern to identify each respective side lamp; and
ascertain a position of the rear camera relative to the side camera based on the ascertained image content;
construct a composite image comprising the first image and the second image based at least in part on an ascertained trajectory of the motor vehicle; and
display the composite image on the monitor;
wherein the monitor comprises a replacement for a left conventional exterior mirror, the monitor disposed in a cabin of the motor vehicle in front of and to the left of a driver seated in a driver's seat of the motor vehicle;
wherein the side camera comprises a removable camera.

8. The camera monitor system as claimed in claim 7, wherein the rear camera comprises a removable camera.

\* \* \* \* \*